United States Patent

[11] 3,614,005

| [72] | Inventor | Andre Maurice Chartier<br>Paris, France |
|---|---|---|
| [21] | Appl. No. | 723,404 |
| [22] | Filed | Apr. 23, 1968 |
| [45] | Patented | Oct. 19, 1971 |
| [73] | Assignee | R.D.T. Societe pour L'etude, La realisation et al. diffusion des techniques modernes |
| [32] | Priority | Apr. 25, 1967 |
| [33] | | France |
| [31] | | PV 104,015 |

[54] WINDING MACHINE FOR MAKING TUBING
2 Claims, 3 Drawing Figs.

[52] U.S. Cl.................................................. 242/7.22,
138/144, 156/173, 156/446, 242/158 B
[51] Int. Cl........................................................B31c 13/00,
B65h 81/06, F17d 1/08
[50] Field of Search........................................... 242/7.21,
7.22, 7.23, 7.15, 7.16, 158, 158 B; 156/430, 431,
429, 428, 446, 180, 172, 173

[56] References Cited
UNITED STATES PATENTS

| 2,670,144 | 2/1954 | Johnson ...................... | 242/7.15 X |
| 3,039,707 | 6/1962 | Beck et al. ..................... | 242/7.16 |
| 3,262,647 | 7/1966 | Harrison........................ | 242/7.16 |

*Primary Examiner*—Billy S. Taylor
*Attorney*—Scrivener, Parker, Scrivener and Clarke ABSTRACT: Tubing is formed by glass fibers wound around and bonded together on a motor driven mandrel. The fibers can be wound in a honeycomb pattern having overlapping turns by a reciprocating guide carriage. The carriage includes a support reciprocated parallel to the mandrel axis by an endless belt driven in alternate directions by a fist motor. The support carries the fiber guide also reciprocable by an endless belt driven in alternate directions by a second motor. A plurality of cams operate associated variable resistors to control the first and second motors and thereby the relative position of the carriage and the guide on the carriage with respect to the mandrel.

WINDING MACHINE FOR MAKING TUBING

It is already known to make tubes with glass fiber embedded in a synthetic resin. Such tubes generally comprise fiber or thread layers parallel to the generatrices of the tube or wound in helices.

One of the drawbacks of such tubes resides in that it is practically impossible to vary the thickness thereof along their length. This drawback is extremely significant notably in the case of conical tubes the wall thickness of which should be less at the end of smaller diameter than at the other end.

The method according to the invention permits the manufacture of tubes the walls of which can have the desired thickness at any selected location.

The method consists notably in fixing the ends of the threads or fibers to a mandrel, rotating continuously the latter while moving in translation parallely to the axis of the mandrel a carriage distributing said threads or fibers, the thread-guiding device mounted on said carriage being itself moved alternately parallel to said axis.

The invention has also for its object a tubular member of the type made according to the aforesaid method characterized in that it comprises a layer of threads or fibers embedded in a synthetic resin, said layer being helically wound and having partially overlapping turns, which have substantially a honeycomb shape.

Such a tubular element can be used as such or constitute the substratum of fiber glass tubing made according to another process.

A further object of the invention is the provision of a machine for executing the aforesaid method, said machine being characterized in that it comprises a mandrel driven in rotation, a carriage for feeding threads or fibers, means for moving said carriage parallely to the axis of rotation of said mandrel, a thread-guiding device mounted on said carriage to slide parallely to said axis and a control mechanism controlling alternate translatory movements of said guiding device.

According to a further feature of the invention, the mandrel is driven in rotation at a continuous and constant speed whereas the translation speed of the carriage is proportional to the inverse of the desired thickness to be given to the layers of threads or fibers.

Other characterizing features and advantages of the invention will appear from the following description which is to be read in connection with the accompanying drawings in which:

FIG. 3 shows the electrical wiring provided for controlling the thread-guiding device of the machine of FIG. 2.

Figure 1:
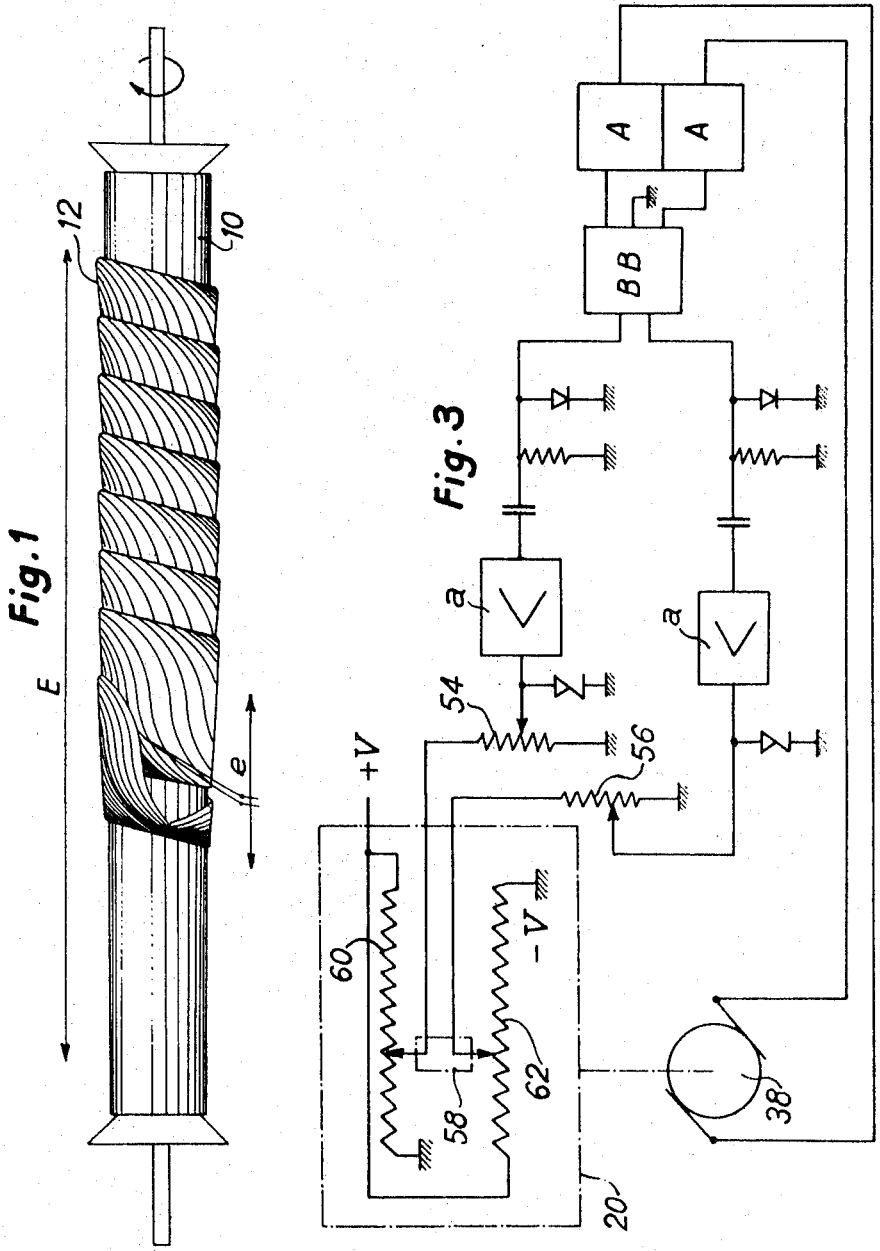
FIG. 1 shows diagrammatically a tube according to the invention during the manufacture thereof.

As viewed on FIG. 1, the method consists in securing the end of a thread at one end of a mandrel 10, then the mandrel 10 is driven in a uniform rotary motion, while the thread is moved at a relatively slow speed parallel to the axis of mandrel 10 toward the other end of the mandrel; simultaneously a reciprocating motion also parallel to the axis of the mandrel is imparted to said thread. The travel of said reciprocating motion has a value "$e$." Due to the speed of rotation of the mandrel and to the frequency of the reciprocating motion of the the thread, the latter is wound substantially according to a honeycomb pattern, the number of reciprocating motions per minute of the thread being slightly greater -or smaller- than the number of revolutions per minute of the mandrel or a multiple thereof in order to obtain the intercrossing of the thread. However because of the slow constant displacement of the thread, there is obtained a helical layer 12 of width "$e$" having overlapping turns. In order to obtain clear cut edges at the ends of the tube, the reciprocating motion near these ends is especially controlled for the first and last turns of the layer as will be seen when reading herebelow the description of the machine used to perform the method just defined hereinabove.

Figure 2:
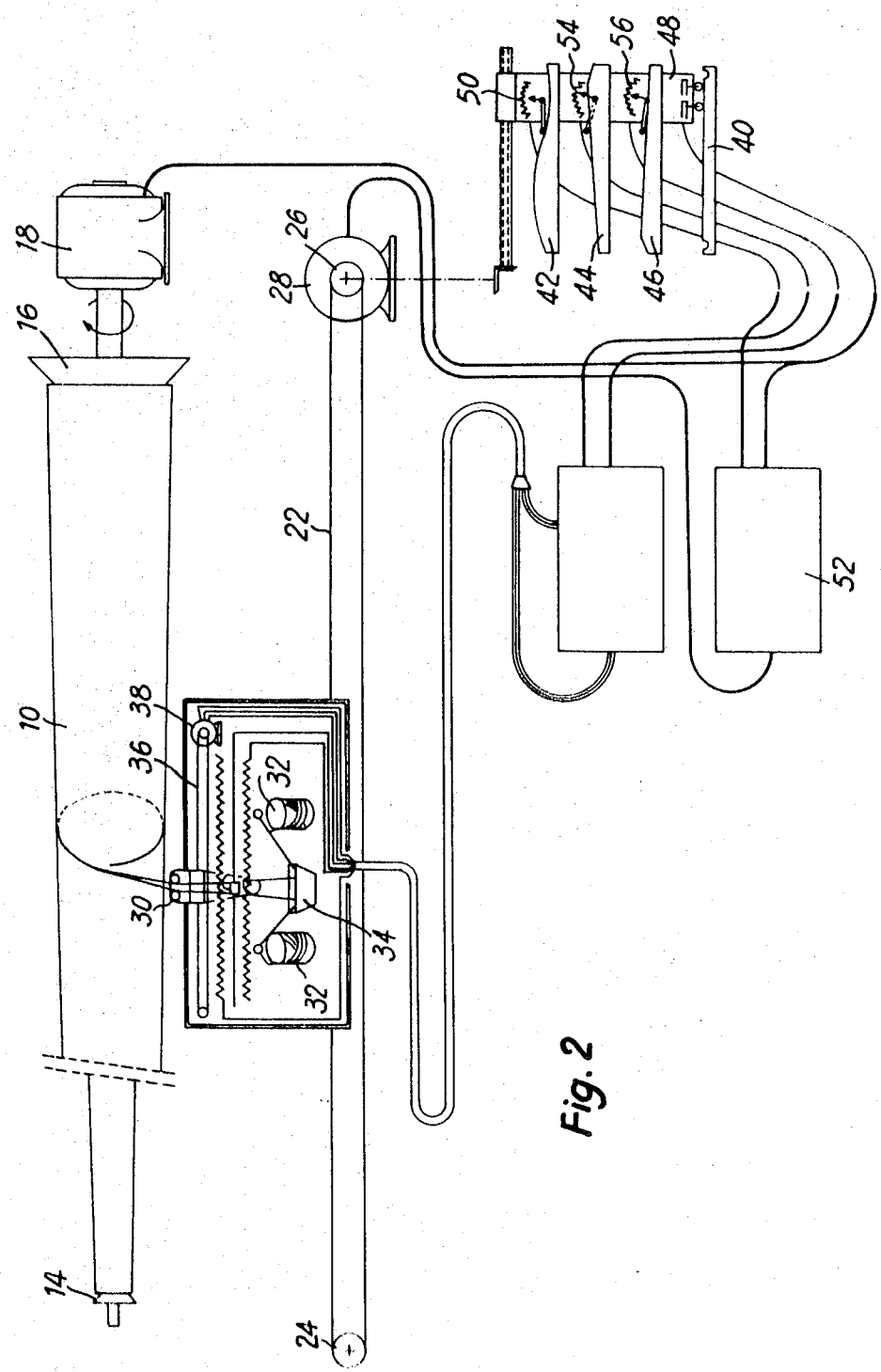
FIG. 2 is a general view of a machine according to the invention.

FIG. 2 is a general view of such a machine.

Mandrel 10 is shown on two supporting pins 14 and 16, the latter (16) being driven in rotation by an electric motor 18. In front of mandrel 10, a carriage, generally designated by reference 20, moves parallel to the axis of said mandrel. An endless chain 22 passing on an idle wheel 24 and on a driving wheel 26 keyed on the shaft of an electric motor 28 moves carriage 20.

Carriage 20 constitutes a movable support for a thread guiding device 30 fed by thread or fiber spools 32 (two of which are shown in the drawing of FIG. 2). The threads or fibers pass through a coating bath vessel 34 containing synthetic resin and then go through the guiding device 30. Said guiding device is reciprocally moved by means of an endless chain 36 driven by a small reversing electric motor 38.

With a view to synchronizing the movements of the various components of the machine, there is provided a set of four stationary cams 40, 42, 44 and 46 with which cooperate followers synchronously driven with electric motor 28 by means such as a mechanical linkage including bevel gear and worm as illustrated.

Cam 40 is provided with a flat contour comprising notches at both ends thereof. A microswitch 48 cooperates with cam 40 and at the end of its travel tilts in one of said notches to stop motor 18 which rotates mandrel 10 and also to stop the motor of carriage 20 and motor 38 of the guiding device 30.

Through a variable resistance 50 connected to an amplifier 52, cam 42 controls the speed of rotation of the motor 28 of carriage 20 and consequently the pitch of the helical layers of threads.

Cams 44 and 46 control through variable resistances 54 and 56 respectively an electronic circuit which in turn controls motor 38 of the thread-guiding device 30.

FIG. 3 shows diagrammatically such an electronic circuit. In said Figure carriage 20 is shown in phantom line as a rectangle. FIG. 3 also shows motor 38 and the two variable resistances 54 and 56. A double slide contact 58 is mounted on the thread-guiding device with which it slides parallely to the axis of mandrel 10. During the sliding motion of the guiding device the double slide contact 58 slides on two parallely extending resistances 60 and 62 connected to the ground at their opposite ends and to a source of voltage +V at their other ends. The contacts of said double slide contact are respectively connected to one of the ends of the variable resistances 54, 56 controlled by cams 44 and 46 respectively. The resistances 54 and 56 are each connected to an amplifier "$a$." The outputs of the to a bistable flip-flop "BB" feeding a double amplifier "A—A" the outputs of which are connected to the primary or secondary circuit of motor 38. The triggering of flip-flop BB causes the reversal of the rotation of motor 38 of the guiding device 30. This reversal is obtained when the triggering threshold of the flip-flop is attained, this occurs for a given direction of motion of the guiding device 30 when the voltage collected by the slide contact on resistance 54 reaches a given value during to the displacement of the guiding device and as a function of the position of cam 44. For the other direction of motion of the guiding device 30 this occurs when the voltage collected by the slide contact on potentiometer 56 reaches a selected value further to the displacement of the guiding device and as a function of the position of cam 46.

As shown in FIG. 2, the contour of cam 44 is provided with a sharp slope of a relatively small length substantially corresponding to the winding of the layer constituting the first turn. This slope is followed by a horizontal or slightly descending portion as shown.

In other words, when the added values of resistances 54 (defined by the position of the follower of cam 40) and of resistance 60 determined by the position of the upper contact— on the drawing—of contact 58) falls under a given value the flip-flop "BB" is triggered and the rotation sense of motor 38 is reversed.

As shown in FIG. 3 of the drawing the resistances 60 and 62 which are identical—being connected with a source of positive voltage at opposite ends the value of resistance 62 is inversely proportional to that of resistance 60. Thus when the rotation of motor 28 is reversed as described above the total values of resistances 62 and 56 are then the highest. Due to the displacement of slide contact 58 driven by motor 28, the total values of resistances 62 and 56 progressively decrease until the triggering threshold of flip-flop "BB" is reached. The total value of resistances 60—54 increases correspondingly from the triggering threshold value to the highest.

Consequently the loops of thread which close to the end of the tube are substantially flattened at the beginning and then less and less flattened. This permits to obtain a tube having a neat clear cut and strong edge. Of course, the above explanation relating to the right portion of cam 44 also applies to the left portion of cam 46 the contour of which permits flattening the turns of the other end edge of the tubing.

At the beginning of the winding of the thread on the mandrel 10 the follower of cam 44 is at the lower end of the sharp slope of said cam. Consequently the value of resistance 54 is relatively small so that the total value of resistances 54 and 60 attains the triggering threshold of flip-flop "BB" before the guiding device 30 together with the slide contact 58 has made a full return travel toward the origin of the winding on the mandrel (right side of FIG. 3).

As the follower of cam 44 climbs the sharp slope of said cam the value of resistance 54 progressively increases resulting in a longer return travel of the guiding device 30 and of the associated slide contact 58 thus compensating for the advance of carriage 20 driven toward the opposite end of the mandrel 10 by motor 28.

What I claim is:

1. A machine for making tubular members comprising a mandrel driven in rotation, a carriage for feeding thread, means for moving said carriage parallel to the axis of rotation of said mandrel in a constant direction, a thread-guiding device mounted on said carriage to slide parallel to said axis, driving means imparting a reciprocating motion to said guiding device with a frequency slightly different than the number of revolutions per second of the mandrel whereby the thread is wound according to a honeycomb pattern and a helical layer of thread having overlapping turns is formed, first cam means, means for driving said first cam means in synchronism with said carriage for controlling the movements of said carriage, second cam means, and means for driving said second cam means in synchronism with said carriage for controlling the reciprocating movements of said guiding device.

2. A machine according to claim 1 wherein variable resistances responsive to the position of said guiding device are mounted on the latter and cooperate with other variable resistances responsive to said second cam means to control the movements of said guiding device on said carriage.